US006950610B2

(12) United States Patent
Lee

(10) Patent No.: US 6,950,610 B2
(45) Date of Patent: Sep. 27, 2005

(54) OPTICAL COMMUNICATION INTERFACE MODULE FOR UNIVERSAL SERIAL BUS

(75) Inventor: Seung-ill Lee, Suwon (KR)

(73) Assignee: Opticis Co., LTD, Kyungki-do (KR)

( * ) Notice: Subject to any disclaimer, the term of this patent is extended or adjusted under 35 U.S.C. 154(b) by 679 days.

(21) Appl. No.: 09/983,581

(22) Filed: Oct. 25, 2001

(65) Prior Publication Data

US 2002/0067530 A1 Jun. 6, 2002

(30) Foreign Application Priority Data

Dec. 5, 2000 (KR) ........................................ 2000-73477

(51) Int. Cl.[7] ........................ H04B 10/12; H04B 10/00; H04B 10/04; H04B 9/00; H03K 9/00

(52) U.S. Cl. ....................... 398/141; 398/135; 398/139; 398/200; 398/115; 375/316; 370/110.4; 385/24

(58) Field of Search ................................ 398/182, 192, 398/193, 183, 196, 197, 200, 141, 135, 139, 115; 375/286, 295, 316; 370/110.4; 385/24

(56) References Cited

U.S. PATENT DOCUMENTS 5,864,587 A 1/1999 Hunt
6,141,719 A 10/2000 Rafferty et al.

FOREIGN PATENT DOCUMENTS

| | | |
|---|---|---|
| FR | 2 787 603 A1 | 6/2000 |
| JP | 11-338587 | 12/1999 |
| JP | 2000-183920 | 6/2000 |
| JP | 2000284872 | 10/2000 |

*Primary Examiner*—M. R. Sedighian
*Assistant Examiner*—Quan-Zhen Wang
(74) *Attorney, Agent, or Firm*—Rothwell, Figg, Ernst & Manbeck, P.C.

(57) ABSTRACT

An optical communication interface module includes a combined transmission module and a combined reception module. The combined transmission module processes a D+ electrical data signal and a D− electrical data signal, and combines and transmits the same through a first optical fiber line. The combined reception module processes the D+ and D− electrical data signals combined and received through a second optical fiber line, and applies the D+ and D− electrical data signals to a D+ port and D− port, respectively. The combined transmission module includes a transmission driving circuit that generates an optical data signal corresponding to one of the D+ and D− electrical data signals, and a transmission control switch that controls the optical data signal to have a level of brightness higher than a first set value while the D+ and D− electrical data signals are both maintained at a logic 'low' state, and controls the transmission driving circuit.

7 Claims, 4 Drawing Sheets

OPTICAL COMMUNICATION INTERFACE MODULE FOR UNIVERSAL SERIAL BUS

BACKGROUND OF THE INVENTION

1. Field of the Invention

The present invention relates to an optical communication module for a universal serial bus, and more particularly, to an optical communication module for connecting D+ and D− ports of one-side universal serial bus to D+ and D− ports of the other-side universal serial bus through optical fiber liens.

2. Description of the Related Art

A universal serial bus (USB) is a bus of a protocol used in data communication between a computer and a wide variety of computer peripheral devices, and is often used in view of high compatibility in data communication. Such a USB is composed of a Vcc power line of 5 V, a ground line, a D+ data line and a D− data line. In D+ and D− data signals loaded on the D+ and D− data lines, the signals are both at a logic 'low' state in a "single-end-zero" area and are of opposite logic states in the other area.

If a one-side USB is connected to the other-side USB using metal lines, an allowable communication distance becomes shorter and a transmission rate is reduced due to a line voltage drop. To solve these problems, optical communication interface modules for connecting universal serial buses through optical fiber lines have recently been developed.

Referring to FIG. 1, a conventional optical communication interface module for a USB is constructed such that D+ and D− data signals of the USB are transmitted and received through different optical fiber lines.

A D+ port 106 of a side "A" USB is connected to a first D+ control switch 101 and a D− port 116 of a side "A" USB is connected to a first D− control switch 111. Likewise, a D+ port 126 of a side "B" USB is connected to a second D+ control switch 121 and a D− port 136 of a side "B" USB is connected to a second D− control switch 131.

The first and second D+ control switches 101 and 121 allow the D+ data signals input through first and second D+ amplifiers 103 and 123 not to be fed back through the first and second D+ drivers 102 and 122. The first and second D+ drivers 102 and 122 drive light emitting devices (LEDs) 104 and 124 in response to corresponding electrical data signals D+A and D+B, to generate corresponding D+ optical data signals. The D+ optical data signals supplied from the LEDs 104 and 124 are input to photo diodes 125 and 105, respectively, through optical fiber lines OF1 and OF2. The first and second D+ amplifiers 103 and 123 amplify data signals supplied from the photo diodes 105 and 125 to apply the same to the D+ ports 106 and 126.

Likewise, the first and second D− control switches 111 and 131 allow the D− data signals input through first and second D− amplifiers 113 and 133 not to be fed back through the first and second D− drivers 112 and 132. The first and second D− drivers 112 and 132 drive light emitting devices (LEDs) 114 and 134 in response to corresponding electrical data signals D−A and D−B, to generate corresponding D− optical data signals. The D− optical data signals supplied from the LEDs 114 and 134 are input to photo diodes 135 and 115, respectively, through optical fiber lines OF3 and OF4. The first and second D− amplifiers 113 and 133 amplify data signals supplied from the photo diodes 115 and 135 to apply the same to the D− ports 116 and 136.

As described above, the conventional optical communication interface module for a USB is constructed such that D+ and D− data signals of the USB are transmitted and received through different optical fiber lines because there is a single-end-zero area in which two data signals are both at a logic 'low' state. Accordingly, although the two data signals are at opposite logic states in areas other than the single-end-zero area, they must be transmitted and received through different optical fiber lines, resulting in a necessity of excessively many optical fiber lines.

SUMMARY OF THE INVENTION

To solve the above-described problems, it is an object of the present invention to provide an optical communication interface module for a universal serial bus, the module which can reduce the number of necessary optical fiber lines using signal characteristics of a universal serial bus.

To accomplish the above object, there is provided an optical communication interface module including a combined transmission module and a combined reception module. The combined transmission module processes a D+ electrical data signal supplied from a D+ port of a universal serial bus (USB) and a D− electrical data signal supplied from a D− port, and combines and transmits the same through a first optical fiber line. The combined reception module processes the D+ and D− electrical data signal combined and received through a second optical fiber line and applying the D+ and D− electrical data signals to the D+ port and the D− port, respectively. Here, the combined transmission module may include a transmission driving circuit and a transmission control switch. The transmission driving circuit generates an optical data signal corresponding to one of the D+ and D− electrical data signals supplied from the D+ and D− ports of the USB, to be applied to the first optical fiber line. The transmission control switch controls the optical data signal to have a level of brightness higher than a first set value while the D+ electrical data signal supplied from the D+ port of the USB and the D− electrical data signal supplied from the D− port of the USB, are both maintained at a logic 'low' state, and controls the transmission driving circuit not to be driven by the electrical data signals applied to the D+ port or the D− port.

According to the optical communication interface module for a universal serial bus, single-end-zero areas of the D+ and D− data signals can be detected in the combined reception module by the operation of the transmission control switch. Thus, only an optical data signal corresponding to one of the D+ and D− data signals can be transmitted by the transmission driver. This is possible because the logic states of the two signals are always opposite to each other in areas other than the single-end-zero areas. Since only an optical data signal corresponding to one of the D+ and D− data signals is transmitted, the number of optical fiber lines required for data signal transmission can be reduced to a half.

Preferably, the combined reception module includes an opto-electric converter, a signal separator and a reception controller. The opto-electric converter converts the optical data signal received through the second optical fiber line into an electrical data signal. The signal separator processes the electrical data signal supplied from the opto-electric converter, generates D+ and D− electrical data signals and applies the generated signals to the D+ and D− ports, respectively. The reception controller controls the D+ and D− electrical data signals applied to the D+ and D− ports to be at a logic 'low' state while the electrical data signals are higher than a second set value which is proportional to a first set value.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
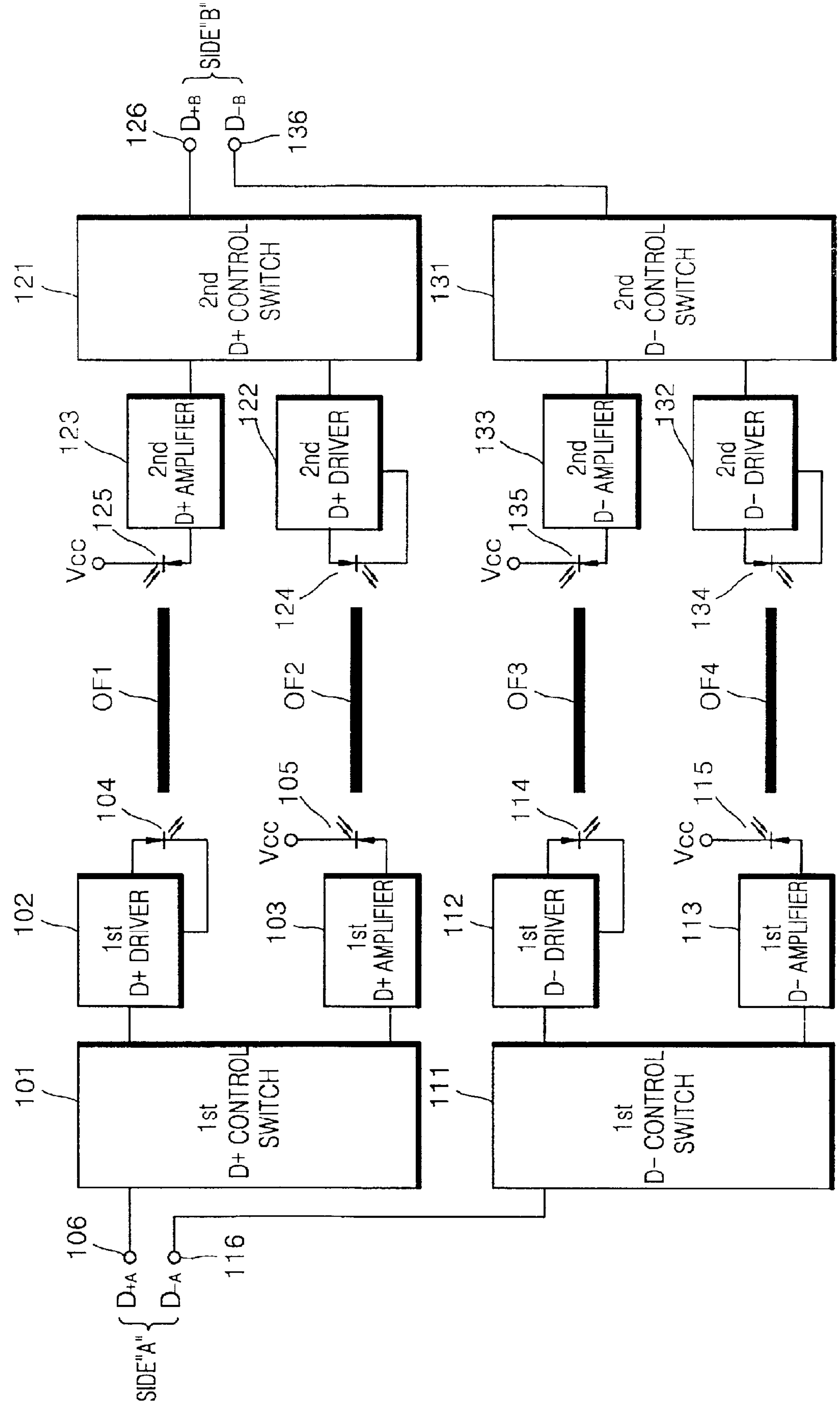
FIG. 1 is a diagram of a conventional optical communication interface module for a universal serial bus.
Figure 2:
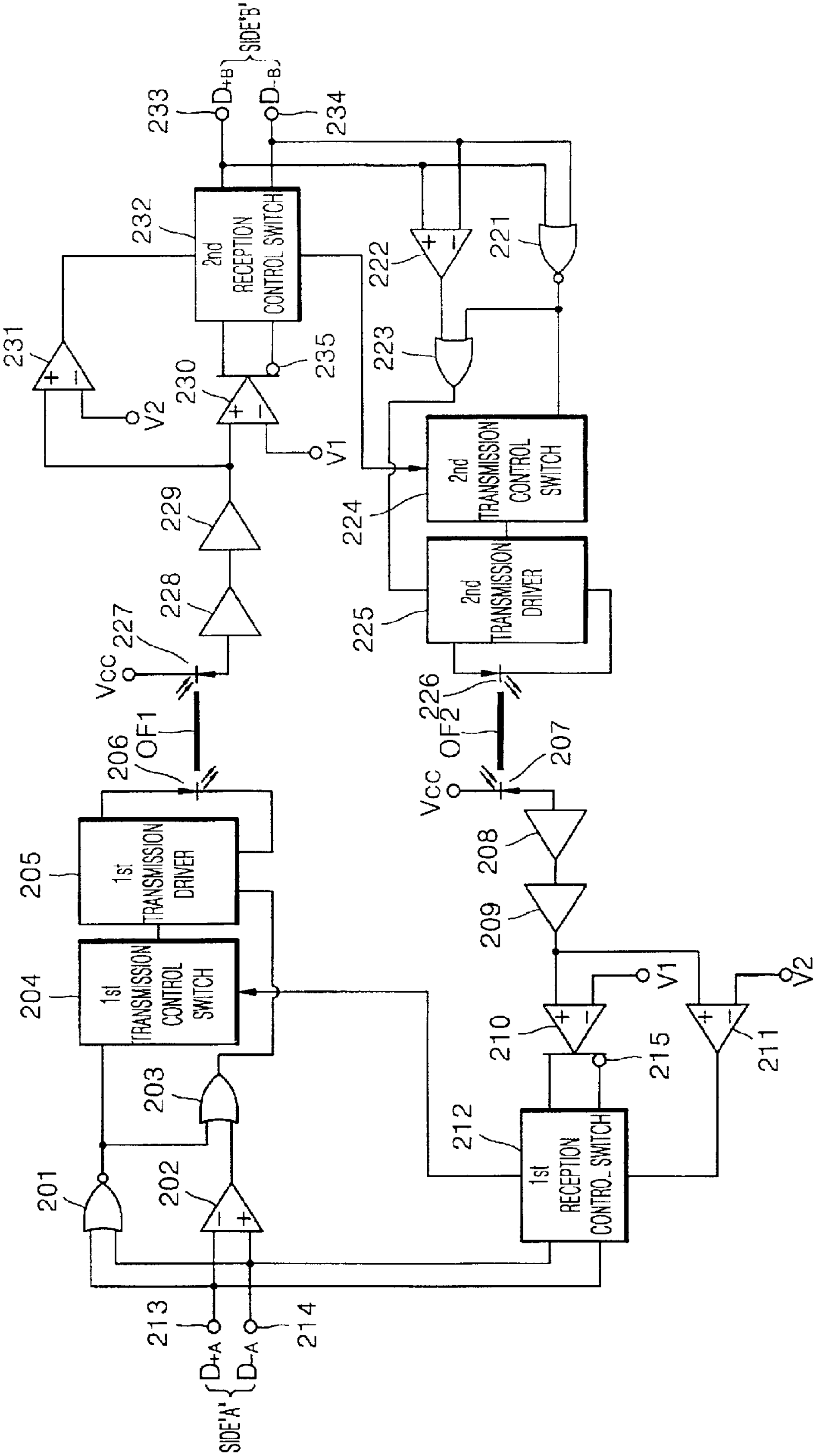
FIG. 2 is a diagram of an optical communication interface module for a universal serial bus according to a preferred embodiment of the present invention.
Figure 3:
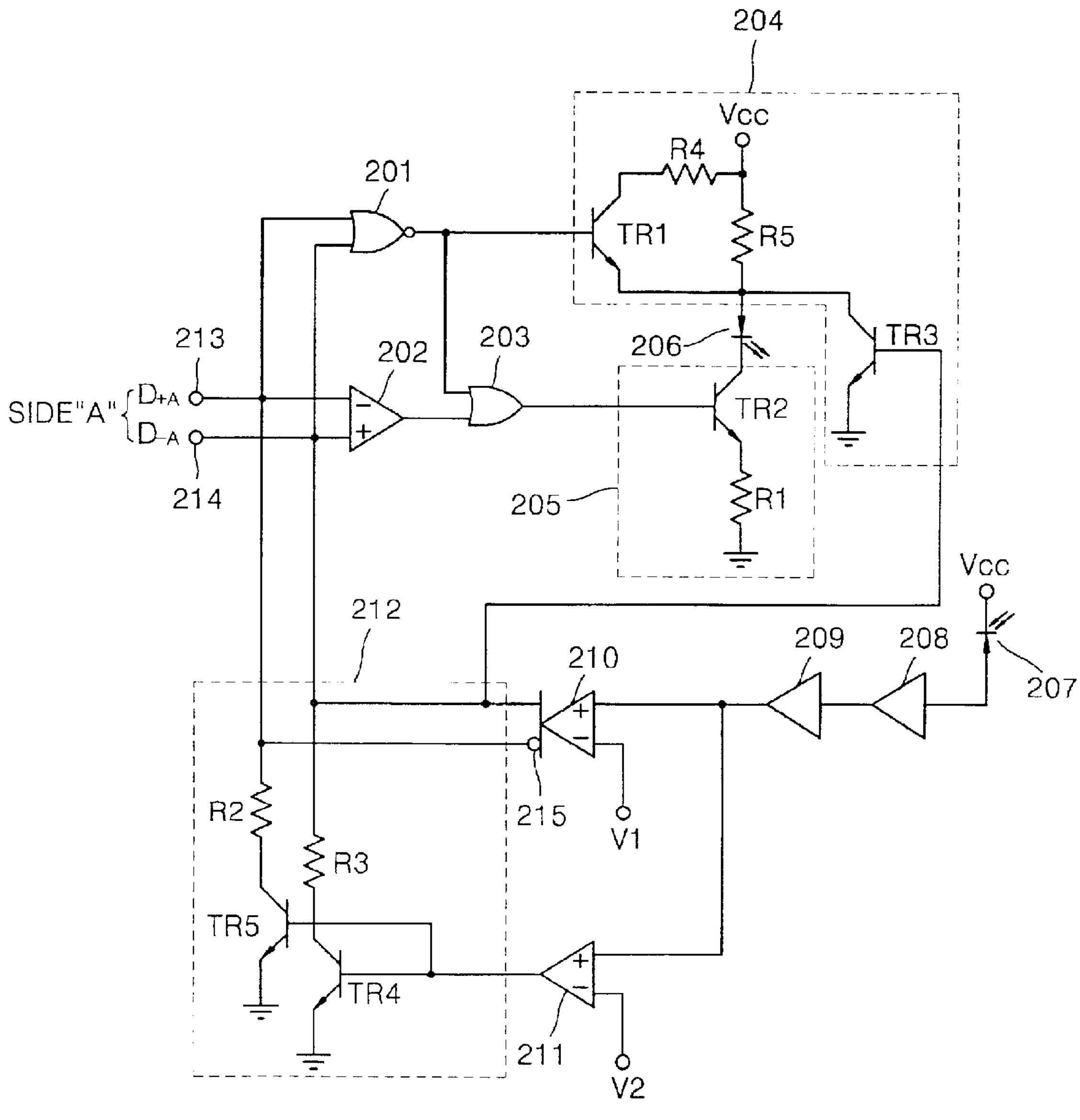
FIG. 3 is a diagram of the optical communication interface module of a side "A" shown in FIG. 2.

Referring to FIGS. 2 and 3, an optical communication interface module for a universal serial bus (USB) according to a preferred embodiment of the present invention includes combined transmission modules 201–206 of the side "A" or 221–226 of the side "B", and combined reception modules 207–212 of the side "A" or 227–232 and 235 of the side "B".

The combined transmission modules 201–206 of the side "A" and 221–226 of the side "B" process D+ electrical data signals D+A and D+B supplied from D+ ports 213 and 233 of the USB and D− electrical data signals D−A and D−B supplied from D− ports 214 and 234, and combine and transmit the same through a first optical fiber line OF1 of the side "A" or OF2 of the side "B". The combined reception modules 207–212 and 215 of the side "A" and 227–232 and 235 of the side "B" process the D+ and D− electrical data signals combined and received through a second optical fiber line OF2 of the side "A" or OF1 of the side "B", and apply the D+ and D− electrical data signals to the D+ ports 213 and 233 and the D− ports 214 and 234, respectively. Here, the combined transmission modules 201–206 of the side "A" and 221–226 of the side "B" include transmission driving circuits 201, 202, 203, 205 and 206 of the side "A" or 221, 222, 223, 225 and 226 of the side "B" and a transmission control switch 204 of the side "A" or 225 of the side "B".

The transmission driving circuits 201, 202, 203, 205 and 206 of the side "A" or 221, 222, 223, 225 and 226 of the side "B" drive optical data signals corresponding to the D− electrical data signals D−A and D−B, supplied from the D− ports 214 and 234 of the USB, to be applied to the first optical fiber line OF1 of the side "A" or OF2 of the side "B". The transmission control switch 204 of the side "A" or 225 of the side "B" controls the optical data signals to have a level of brightness higher than a first set value while the D+ electrical data signals D+A and D+B, supplied from the D+ ports 213 and 233 of the USB and the D− electrical data signals D−A and D−B, supplied from the D− ports 214 and 234 of the USB, are all maintained at a logic 'low' state, and controls the transmission drivers 205 and 225 not to be driven by the electrical data signals applied to the D+ ports 213 and 233 or the D− ports 214 and 234.

Accordingly, since single-end-zero areas of the D+ and D− data signals can be detected from the corresponding combined reception modules 207–212 and 215 of the side "A" and 227–232 and 235 of the side "B" by the operation of the transmission control switches 204 and 224, only an optical data signal corresponding to one of the D+ electrical data signal D+A of the side "A" or D+B of the side "B" and the D− electrical data signal D−A of the side "A" or D−B of the side "B", for example, only the optical data signal corresponding to the D− electrical data signal, can be transmitted. This is possible because the logic states of the two signals, that is, the D+ electrical data signals D+A and D−A of the side "A" or the D− electrical data signals D+B and D−B, are always opposite to each other in areas other than the single-end-zero areas. Since only an optical data signal corresponding to one of the two signals, that is, the D+ electrical data signals D+A and D−A of the side "A" or the D− electrical data signals D+B and D−B of the side "B", is selectively transmitted, the two optical fiber lines only, that is, OF1 and OF2, are used for signal transmission.

The transmission driving circuits 201, 202, 203, 205 and 206 of the side "A" or 221, 222, 223, 225 and 226 of the side "B" include comparators 202 and 222, NOR gates 201 and 221, OR gates 203 and 223, LEDs 206 and 226 and transmission drivers 205 and 225.

The comparators 202 and 222 receive the D+ electrical data signals D+A and D+B of the D+ ports 213 and 223 through their negative (−) input ports, receive the D− electrical data signals D−A and D−B of the D− ports 214 and 234 through their positive (+) input ports, and generate electrical data signals of the same logic state, e.g., the D− electrical data signals D−A and D−B. The NOR gates 201 and 221 generate electrical control signals going 'high' only when the D+ electrical data signals D+A and D+B and the D− electrical data signals D−A and D−B are all at a logic 'low' state. The OR gates 203 and 223 generate electrical data signals being at a logic 'high' only when the electrical data signals generated from the comparators 202 and 222 are maintained at a logic 'high' state or the electrical data signals generated from the NOR gates 201 and 221 are maintained at a logic 'high' state. The LEDs 206 and 226 allow light having brightness proportional to a driving voltage applied to their anodes to be applied to the first optical fiber line OF1 of the side "A" or OF2 of the side "B". The transmission drivers 205 and 225 make the logic states of the LEDs 206 and 226 the same as those of the electrical data signals from the OR gates 203 and 223. Here, each of the transmission drivers 205 and 225 includes a transistor (TR2 of the side "A" as shown in FIG. 3) and a resistor (R1 of the side "A", as shown in FIG. 3).

Each of the transmission control switches 204 and 224 includes first and second transistors (TR1 and TR3 of the side "A", as shown in FIG. 3). The first transistor TR1 is turned on only when the electrical control signal of the NOR gate 201 is maintained at a logic 'high' state, to make the driving voltage applied to the anode of the LED 206 higher than the voltage of a predetermined set value. In other words, when the first transistor TR1 is turned on, the driving voltage applied to the anode of the LED 206 becomes higher than the voltage of the set value because a resistor between a power terminal Vcc and the LED 206 is close to a parallel-combined resistance of resistors R4 and R5. The second transistor TR3 is turned on only when the electrical data signal applied to the D− port is maintained at a logic 'high' state, so that the driving voltage applied to the anode of the LED 206 becomes close to a ground voltage.

The combined reception modules 207–212 and 215 of the side "A" and 227–232 and 235 of the side "B" include opto-electric converters 207, 208 and 209 of the side "A" and 227, 228 and 229 of the side "B", signal separators 210 and 215 of the side "A" and 230 and 235 of the side "B" and reception controllers 211 and 212 of the side "A" and 231 and 232 of the side "B".

The opto-electric converters 207, 208 and 209 of the side "A" and 227, 228 and 229 of the side "B" convert optical data signals received through the second optical fiber line OF2 of the side "A" or OF1 of the side "B" into electrical data signals. The signal separators 210 and 215 of the side "A" and 230 and 235 of the side "B" process the electrical data signals from the opto-electric converters 207, 208 and 209 of the side "A" and 227, 228 and 229 of the side "B" and generate D+ and D− electrical data signals to then be applied to the D+ and D− ports, respectively. The reception controllers 211 and 212 of the side "A" and 231 and 232 of the side "B" control the D+ and D− electrical data signals to be applied to the D+ and D− ports, respectively, to go 'low' while the electrical data signals from the opto-electric converters 207, 208 and 209 of the side "A" and 227, 228 and 229 of the side "B" are higher than the second set value. Accordingly, the D− electrical data signals applied to the D− ports 214 and 234 are not fed back through the corresponding transmission driving circuits.

The opto-electric converters 207, 208 and 209 of the side "A" and 227, 228 and 229 of the side "B" include photo diodes 207 and 227 as opto-electric conversion elements, current-to-voltage converters 208 and 228 and amplifiers 209 and 229, respectively. The photo diodes 207 and 227 convert the optical data signals received through the second optical fiber line OF2 of the side "A" or OF1 of the side "B" into current data signals. The current-to-voltage converters 208 and 228 convert the current data signals from the photo diodes 207 and 227 into voltage data signals. The amplifiers 209 and 229 amplify the voltage data signals from the current-to-voltage converters 208 and 228 with a predetermined degree of amplification.

The signal separators 210 and 215 of the side "A" and 230 and 235 of the side "B" include comparators 210 and 230 and inverters 215 and 235. The comparators 210 and 230 generate the D− electrical data signals being at a logic 'high' state only when the voltage data signals from the amplifiers 209 and 229 are higher than a first reference voltage V1. The inverters 215 and 235 generate D+ electrical data signals inverted from the D− electrical data signals of the comparators 210 and 230 to be applied to the D+ ports 213 and 233.

The reception controllers 211 and 212 of the side "A" and 231 and 232 of the side "B" include comparators 211 and 231, a D+ control transistor (TR5 of the side "A", as shown in FIG. 3) and a D− control transistor (TR4 of the side "A", as shown in FIG. 3). The comparators 211 and 231 generate control signals of a logic 'high' state only when the voltage data signals of the amplifiers 209 and 229 are higher than the second reference voltage V1. The D+ control transistor (TR5 of the side "A", as shown in FIG. 3) has a collector connected to the D+ port 213 (or 233 of the side "B"), a base connected to the output port of the comparator 211 (or 231 of the side "B") and an emitter connected to a ground port. The D− control transistor (TR4 of the side "A", as shown in FIG. 3) has a collector connected to the D− port 214 (or 234 of the side "B"), a base connected to the output port of the comparator 211 (or 231 of the side "B") and an emitter connected to a ground port. While logic 'high' control signals are generated from the comparators 211 and 231, the D+ control transistor (TR5 of the side "A", as shown in FIG. 3) and the D− control transistor (TR4 of the side "A", as shown in FIG. 3) are turned on, so that a single-end-zero area in which the two signals D+B and D−B are both at a logic 'low' state, are detected.

Figure 4:
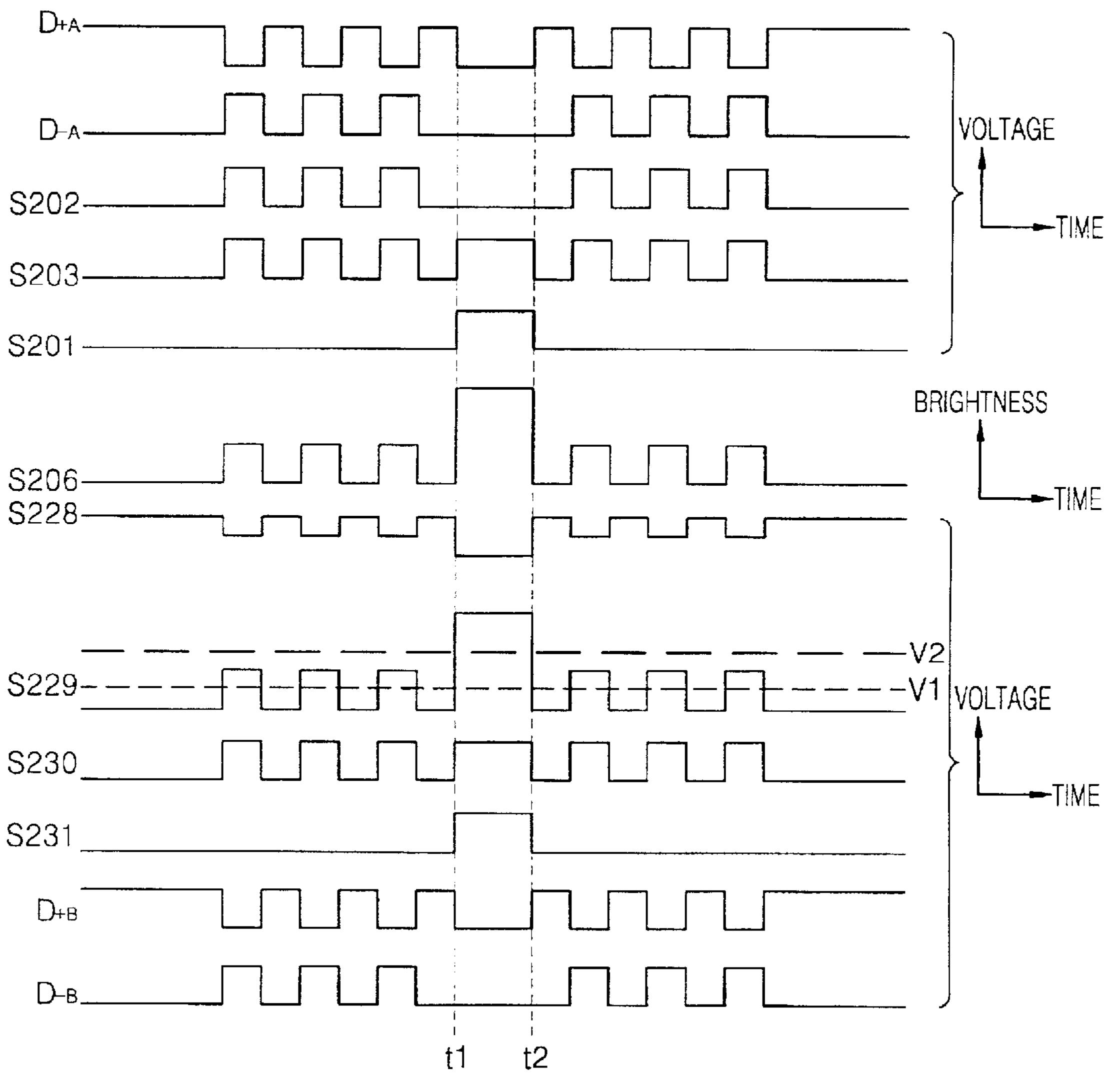
FIG. 4 is a timing diagram showing the operating states of various parts of a combined transmission module of a side "A" and a combined reception module of a side "B" shown in FIG. 2.

FIG. 4 is a timing diagram showing the operating states of various parts of a combined transmission module of a side "A" and a combined reception module of a side "B" shown in FIG. 2. In FIG. 4, reference symbol D+A denotes the output signal of the D + port (213 of FIG. 2), reference symbol D−A denotes the output signal of the D− port (214 of FIG. 2), reference symbol S202 denotes the output signal of the comparator of the side "A" (202 of FIG. 2), reference symbol S203 denotes the output signal of the OR gate of the side "A" (203 of FIG. 2), reference symbol S201 denotes the output signal of the NOR gate of the side "A" (201 of FIG. 2), reference symbol S206 denotes the intensity of light emitted from the LED of the side "A" (206 of FIG. 2), reference symbol S228 denotes the output signal of the current-to-voltage converter of the side "B" (228 of FIG. 2), reference symbol S229 denotes the output signal of the amplifier of the side "B" (229 of FIG. 2), reference symbol S230 denotes the output signal of the comparator (230 of FIG. 2) of the signal separator of the side "B", reference symbol S231 denotes the output signal of the comparator (231 of FIG. 2) of the reception controller of the side "B", reference symbol D+B denotes the input signal of the D+ port of the side "B" (233 of FIG. 2), and reference symbol D−B denotes the input signal of the D− port of the side "B" (234 of FIG. 2), respectively.

Referring to FIG. 4, the signals D+A and D−A to be transmitted through USB are inverted at every area except single-end-zero areas in the time period between t1 and t2. The output signal S202 of the comparator of the side "A" (202 of FIG. 2) is of the same logic state with the signal D−A. The output signal S203 of the OR gate of the side "A" (203 of FIG. 2) is always maintained at a logic 'high' state in the single-end-zero area (t1~t2) and is of the same logic state with the output signal S202 of the comparator of the side "A" (202 of FIG. 2) in areas other than the single-end-zero area. The output signal S201 of the NOR gate of the side "A" (201 of FIG. 2) is always maintained at a logic 'high' state in the single-end-zero area (t1~t2) and is maintained at a logic 'low' state in areas other than the single-end-zero area (t1~t2). Accordingly, the optical data signal S206 emitted from the LED of the side "A" (206 of FIG. 2) is brightest in the single-end-zero area (t1~t2) and is turned into a normal brightness level in areas other than the single-end-zero area (t1~t2).

The output signal S228 of the current-to-voltage converter of the side "B" (228 of FIG. 2) is inverted from the optical data signal S206 incident into the photo diode of the side "B" (227 of FIG. 2). The output signal S229 of the amplifier of the side "B" (229 of FIG. 2) is inverted and amplified from the output signal S228 of the output signal S228 of the current-to-voltage converter of the side "B" (228 of FIG. 2). Here, a reference voltage V2 of the comparator (231 of FIG. 2) of the reception controller is lower than a pulse voltage in the single-end-zero area (t1~t2) and is higher than a pulse voltage in areas other than the single-end-zero area (t1~t2). Also, the reference voltage V2 of the comparator (230 of FIG. 2) of the signal separator is lower than a pulse voltage in areas other than the single-end-zero area (t1~t2). Thus, Also, the logic state of the output signal S230 of the comparator (230 of FIG. 2) of the signal separator becomes the same as that of the output signal S203 of the OR gate of the side "A" (203 of FIG. 2). Also, the logic state of the output signal S231 of the comparator (231 of FIG. 2) of the reception controller becomes the same as that of the output signal S201 of the NOR gate of the side "A" (201 of FIG. 2). Thus, referring back to FIG. 3, the input signal D+B of the D+ port of the side "B" (233 of FIG. 2) has the same operating state as that of the output signal D+A of the D+ port of the side "A" (213 of FIG. 2), and the input signal D−B of the D− port of the side "B" (233 of FIG. 2) has the same operating state as that of the output signal D−A of the D− port of the side "A" (214 of FIG. 2).

As described above, according to the optical communication interface module for a universal serial bus, single-end-zero areas of the D+ and D− data signals can be detected in the combined reception module by the operation of the transmission control switch. Thus, only an optical data signal corresponding to one of the D+ and D− data signals can be transmitted by the transmission driver. This is possible because the logic states of the two signals are always opposite to each other in areas other than the single-end-zero areas. Since only an optical data signal corresponding to one of the D+ and D− data signals is selectively transmitted, the number of optical fiber lines required for data signal transmission can be reduced to a half.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An optical communication interface module comprising a combined transmission module for processing a D+ electrical data signal supplied from a D+ port of a universal serial bus (USB) and a D− electrical data signal supplied from a D− port, and combining and transmitting the same through a first optical fiber line, and a combined reception module for processing the D+ and D− electrical data signal combined and received through a second optical fiber line and applying the D+ and D− electrical data signals to the D+ port and the D− port, respectively, wherein the combined transmission module comprises:

a transmission driving circuit for generating an optical data signal corresponding to one of the D+ and D− electrical data signals supplied from the D+ and D− ports of the USB, to be applied to the first optical fiber line; and a transmission control switch for controlling the optical data signal to have a level of brightness higher than a first set value while the D+ electrical data signal supplied from the D+ port of the USB and the D− electrical data signal supplied from the D− port of the USB, are both maintained at a logic 'low' state, and controlling the transmission driving circuit.

2. The optical communication interface module of claim 1, wherein the transmission driving circuit comprises:

a comparator for receiving the D+ electrical data signal of the D+ port through its negative (−) input port, receiving the D− electrical data signal of the D− port through its positive (+) input port, and generating an electrical data signal of the same logic state;

a NOR gate for generating an electrical control signal going 'high' only when the D+ electrical data signal and the D− electrical data signal are both at a logic 'low' state;

an OR gate for generating an electrical data signal being at a logic 'high' only when the electrical data signal generated from the comparator is maintained at a logic 'high' state or the electrical data signal generated from the NOR gate is maintained at a logic 'high' state;

a light emitting device (LED) for allowing light having brightness proportional to a driving voltage applied to its anode to be applied to the first optical fiber line; and a transmission driver for making the logic state of the LED the same as the logic state of the electrical data signal from the OR gate.

3. The optical communication interface module of claim 1, wherein the transmission control switch comprises:

a first transistor turned on only when the electrical control signal of the NOR gate is maintained at a logic 'high' state, to make the driving voltage applied to the anode of the LED higher than the voltage of a predetermined set value; and a second transistor turned on only when the electrical data signal applied to the D− port is maintained at a logic 'high' state, so that the driving voltage applied to the anode of the LED becomes close to a ground voltage.

4. The optical communication interface module of claim 1, wherein the combined reception module comprises:

an opto-electric converter for converting an optical data signal received through the second optical fiber line into electrical data signal;

a signal separator for processing the electrical data signal from the opto-electric converter and generating D+ and D− electrical data signals to then be applied to the D+ and D− ports, respectively; and a reception controller for controlling the D+ and D− electrical data signals to be applied to the D+ and D− ports, respectively, to go 'low' while the electrical data signal from the opto-electric converter is higher than the second set value which is proportional to the first set value.

5. The optical communication interface module of claim 1, further comprising an opto-electric converter, the opto-electric converter comprising:

an opto-electric converting device for converting the optical data signal received through the second optical fiber line into a current data signal;

a current-to-voltage converter for converting the current data signal from the opto-electric converting device into a voltage data signal; and an amplifier for amplifying the voltage data signal from the current-to-voltage converter with a predetermined degree of amplification.

6. The optical communication interface module of claim 1, wherein the transmission driver of the combined transmission module allows the optical data signal corresponding to the D− electrical data signal of the D− port incident into the first optical fiber line, and the further comprising a signal separator, the signal separator comprising:

a comparator for generating the D− electrical data signal being at a logic 'high' state only when the voltage data signal from the amplifier of the opto-electric converter is higher than a third set value smaller than the second set value, and applying the same to the D− port; and an inverter for generating a D+ electrical data signal inverted from the D− electrical data signal from the comparator to be applied to the D+ port.

7. The optical communication interface module of claim 1, further comprising a reception controller the reception controller comprising:

a comparator for generating a control signal of a logic 'high' state only when the voltage data signal of the amplifier of the opto-electric converter is higher than the second set value;

a D+ control transistor having a collector connected to the D+ port, a base connected to the output port of the comparator and an emitter connected to a ground port; and a D− control transistor having a collector connected to the D− port, a base connected to the output port of the comparator and an emitter connected to a ground port.

* * * * *